(12) United States Patent
Heo et al.

(10) Patent No.: US 11,182,012 B2
(45) Date of Patent: Nov. 23, 2021

(54) DISPLAY DEVICE AND PORTABLE DEVICE HAVING THE SAME

(71) Applicant: SAMSUNG DISPLAY CO., LTD., Yongin-si (KR)

(72) Inventors: Sanghyun Heo, Hwaseong-si (KR); Chul Kim, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 17/000,747

(22) Filed: Aug. 24, 2020

(65) Prior Publication Data
US 2021/0173513 A1 Jun. 10, 2021

(30) Foreign Application Priority Data
Dec. 4, 2019 (KR) .......................... 10-2019-0159964

(51) Int. Cl.
*G06F 3/041* (2006.01)
*G06F 1/16* (2006.01)
*H04M 1/02* (2006.01)

(52) U.S. Cl.
CPC .......... *G06F 3/0416* (2013.01); *G06F 1/1626* (2013.01); *G06F 1/1643* (2013.01); *G06F 3/0412* (2013.01); *H04M 1/0266* (2013.01); *H04M 2250/22* (2013.01)

(58) Field of Classification Search
CPC ...... G06F 3/0412; G06F 3/0416; G06F 3/044; G06F 3/0446; G06F 3/0418; G06F 1/1626; G06F 1/1643; H04M 1/0266; H04M 1/0285; H04M 2250/22; G09G 3/20; G09G 3/3233
See application file for complete search history.

(56) References Cited

U.S. PATENT DOCUMENTS

| | | | |
|---|---|---|---|
| 6,133,906 A * | 10/2000 | Geaghan | G06F 3/0442 345/179 |
| 9,239,637 B2 * | 1/2016 | Westhues | G06F 3/0441 |
| 9,569,041 B2 | 2/2017 | Son | |
| 10,175,736 B2 | 1/2019 | Kim | |
| 2016/0132135 A1 * | 5/2016 | Oda | G06F 3/0446 345/174 |
| 2017/0068339 A1 * | 3/2017 | Zimmerman | G06F 3/0416 |

(Continued)

FOREIGN PATENT DOCUMENTS

| | | |
|---|---|---|
| KR | 10-1830739 | 2/2018 |
| KR | 10-1995403 | 7/2019 |

*Primary Examiner* — Ryan A Lubit
(74) *Attorney, Agent, or Firm* — F. Chau & Associates, LLC

(57) ABSTRACT

The present disclosure relates to a display device. The display device includes a display module and a sensing circuit board including a plurality of sensing dots disposed on the display module and generating a magnetic field. Each of the sensing dots includes continuous first and second periods. Additionally or alternatively, the sensing dots includes a transmitter, a driver, a charger, and an outputter. The transmitter transmits a reference alternating current signal. The driver is connected to the transmitter and a sensing node and outputs a node current signal. The charger is connected to the sensing node and generates a magnetic field. The outputter is electrically connected to an output terminal and outputs a sensing signal.

20 Claims, 9 Drawing Sheets

(56) References Cited

U.S. PATENT DOCUMENTS

| | | | | |
|---|---|---|---|---|
| 2018/0356908 A1* | 12/2018 | Koike | ................... | G06F 3/041 |
| 2018/0364824 A1* | 12/2018 | Hara | ...................... | G06F 3/041 |
| 2019/0012016 A1* | 1/2019 | Kurasawa | ........... | G06F 3/04164 |
| 2019/0121455 A1* | 4/2019 | Hara | ...................... | G06F 3/0383 |
| 2019/0155406 A1 | 5/2019 | Kremin et al. | | |
| 2021/0173245 A1* | 6/2021 | Kurasawa | ............... | G02F 1/133 |

* cited by examiner

DISPLAY DEVICE AND PORTABLE DEVICE HAVING THE SAME

CROSS-REFERENCE TO RELATED APPLICATION

This U.S. non-provisional patent application claims priority under 35 U.S.C. § 119 of Korean Patent Application No. 10-2019-0159964, filed on Dec. 4, 2019, the contents of which are incorporated by reference herein in their entirety.

BACKGROUND

1. Field of Disclosure

The present disclosure relates to a portable device. More particularly, the present disclosure relates to a display device and a portable device with the display device.

2. Description of the Related Art

Display devices include televisions, mobile phones, tablet computers, navigation units, and game units. These display devices may feature a touch-style input panel for a user to control an electronic device through the display panel. In some devices, the touch-style input may be controlled using an external electronic pen. The pen allows a user to write or draw messages or pictures, as well as control a user interface by selecting icons or buttons.

In some cases, the user may experience reliability problems while using the electronic pen. For example, the display device may not accept a touch-input or the location of the identified touch-input may not be the same as the location the user actually selects. Therefore, there is a need in the art for systems and methods for achieving improved sensing reliability when using an electronic pen on a display of a user-controlled display device.

SUMMARY

The present disclosure provides a display device capable of increasing a sensing reliability of an electronic pen. Embodiments of the present disclosure provide a portable device including the display device.

Embodiments of the inventive concept provide a display device including a display module; and a sensing circuit board comprising a plurality of sensing dots disposed on the display module and configured to generate a magnetic field, wherein the sensing circuit board is configured to operate each of the sensing dots according to a first period and a second period, and wherein the sensing circuit board further comprises: a transmitter configured to transmit a reference alternating current signal during the first period in response to an active level of a first selection signal; a driver connected to the transmitter and a sensing node and configured to output a node current signal to the sensing node in response to the reference alternating current signal transmitted through the transmitter during the first period; a charger connected to the sensing node and configured to generate the magnetic field in response to the node current signal; and an outputter configured to be electrically connected to an output terminal in response to an active level of a second selection signal having a phase inverted with respect to the first selection signal during the second period, wherein the outputter is further configured to output a sensing signal to the output terminal in response to a level of the sensing node.

The level of the sensing node is controlled by an intensity of the magnetic field between the charger and an external electronic module during the second period.

When a distance between the sensing circuit board and the external electronic module is within an effective distance, the level of the sensing node has a voltage level of an alternating current waveform during the second period by an external alternating current signal provided from the external electronic module.

The outputter is connected to the sensing node and a power terminal, the outputter outputs a power signal output from the power terminal to the output terminal in response to the voltage level of the alternating current waveform during the second period, and the sensing signal corresponds to the alternating current waveform of the power signal transmitted to the output terminal from the power terminal in response to the voltage level of the alternating current waveform.

When a distance between the sensing circuit board and the external electronic module is out of an effective distance, the level of the sensing node has a voltage level of a direct current waveform during the second period. The charger is disposed between a bias terminal and the sensing node, and the level of the sensing node corresponds to a bias voltage output from the bias terminal.

The output terminal is not electrically connected to the sensing node during the first period in response to an inactive level of the second selection signal, and the output terminal is electrically connected to the sensing node during the second period in response to the active level of the second selection signal.

The sensing node is electrically connected to the transmitter during the first period in response to the active level of the first selection signal, and the sensing node is not electrically connected to the transmitter during the second period in response to an inactive level of the first selection signal.

The transmitter includes a first control transistor including a first control electrode and a first electrode, which are connected to a reference terminal outputting the reference alternating current signal, and a second electrode connected to a power terminal and a second control transistor including a second control electrode receiving the first selection signal, a third electrode connected to the first control electrode, and a fourth electrode connected to the driver.

The driver includes a driving transistor including a driving control electrode connected to the fourth electrode, a first driving electrode connected to the power terminal, and a second driving electrode connected to the sensing node, and the charger includes and one end connected to the sensing node and another end connected to a bias terminal outputting a bias voltage.

The charger includes a first output transistor including a first output control electrode connected to the sensing node, a first output electrode connected to the power terminal, and a second output electrode and a second output transistor including a second output control electrode receiving the second selection signal, a third output electrode connected to the second output electrode, and a fourth output electrode connected to the output terminal.

The sensing circuit board further includes a signal generator outputting the reference alternating current signal, the first selection signal, and the second selection signal to the sensing dots and a converting unit connected to the output terminal to receive the sensing signal and converting the sensing signal to a voltage.

The display module includes a display panel and an input sensing layer disposed on the display panel and sensing an external input. The sensing circuit board is disposed under the display panel. The sensing circuit board is disposed on the input sensing layer, and the sensing dots include a transparent electrode.

Embodiments of the inventive concept provide a display device including a display module; and a sensing circuit board comprising a plurality of sensing dots disposed on the display module and configured to generating a magnetic field, each of the sensing dots comprising: a first control transistor comprising a first control electrode and a first electrode, which are connected to a reference terminal configured to output a reference alternating current signal, and a second electrode connected to a power terminal; a second control transistor comprising a second control electrode configured to receive a first selection signal, a third electrode connected to the first control electrode, and a fourth electrode; a driving transistor comprising a driving control electrode connected to the fourth electrode, a first driving electrode connected to the power terminal, and a second driving electrode connected to the sensing node; an inductor comprising an one end connected to the sensing node and another end connected to a bias terminal and configured to output a bias voltage; a first output transistor comprising a first output control electrode connected to the sensing node, a first output electrode connected to the power terminal, and a second output electrode; and a second output transistor comprising a second output control electrode configured to receive a second selection signal having a phase inverted with respect to the first selection signal, a third output electrode connected to the second output electrode, and a fourth output electrode connected to the output terminal.

Each of the sensing dots includes continuous first and second periods, the second control transistor is turned on in response to the first selection signal with an active level during the first period, and the second output transistor is turned on in response to the second selection signal with an active level during the second period.

A sensing signal with an alternating current waveform or a direct current waveform is output to the output terminal during the second period according to a distance between the sensing circuit board and an external electronic module. The inductor generates a magnetic field based on the reference alternating current signal during the first period.

Embodiments of the inventive concept provide a portable device including a display device; and an electronic module selecting information displayed through the display device, the display device comprising: a display module; and a sensing circuit board comprising a plurality of sensing dots configured to generate a magnetic field with the electronic module, wherein each of the sensing dots is configured to operate according to continuous first and second periods, the sensing circuit board further comprising: a transmitter configured to transmit a reference alternating current signal during the first period in response to an active level of a first selection signal; a driver connected to the transmitter and a sensing node and configured to output a node current signal to the sensing node in response to the reference alternating current signal transmitted through the transmitter during the first period; a charger connected to the sensing node and configured to generate the magnetic field in response to the node current signal; and an outputter configured to be electrically connected to an output terminal in response to an active level of a second selection signal having a phase inverted with respect to the first selection signal during the second period and configured to output a sensing signal to the output terminal in response to a level of the sensing node.

According to the above, the sensing circuit board includes the sensing dots to sense the position information selected by an electronic pen. Each of the sensing dots generates the magnetic field, and the position information selected by the electronic pen is sensed by comparing an intensity of the magnetic field of the sensing dot that is selected by the electronic pen with an intensity of the magnetic field of the sensing dot that is not selected by the electronic pen.

In particular, the sensing circuit board generates the magnetic field in the sensing dot based on the reference current signal during the first period and senses the position information of the external electronic module during the second period following the first period. As a result, the sensing reliability with respect to the electronic pen may be increased.

Embodiments of the present disclosure may include a method of detecting input to an electronic device, the method comprising: generating a first magnetic field at a sensor during a first period, such that the magnetic field causes electromagnetic resonance (EMR) in an external electronic device; detecting a second magnetic field during a second period following the first period, wherein the second magnetic field is based at least in part on the EMR in the external electronic device; and determining a position of the external electronic device based on detecting the second magnetic field.

In some examples, the first magnetic field is based on a first selection signal that has a first active level during the first period and a first inactive level during the second period; and the second magnetic field is detected based on a second selection signal that has a second inactive level during the first period and a second active level during the second period.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
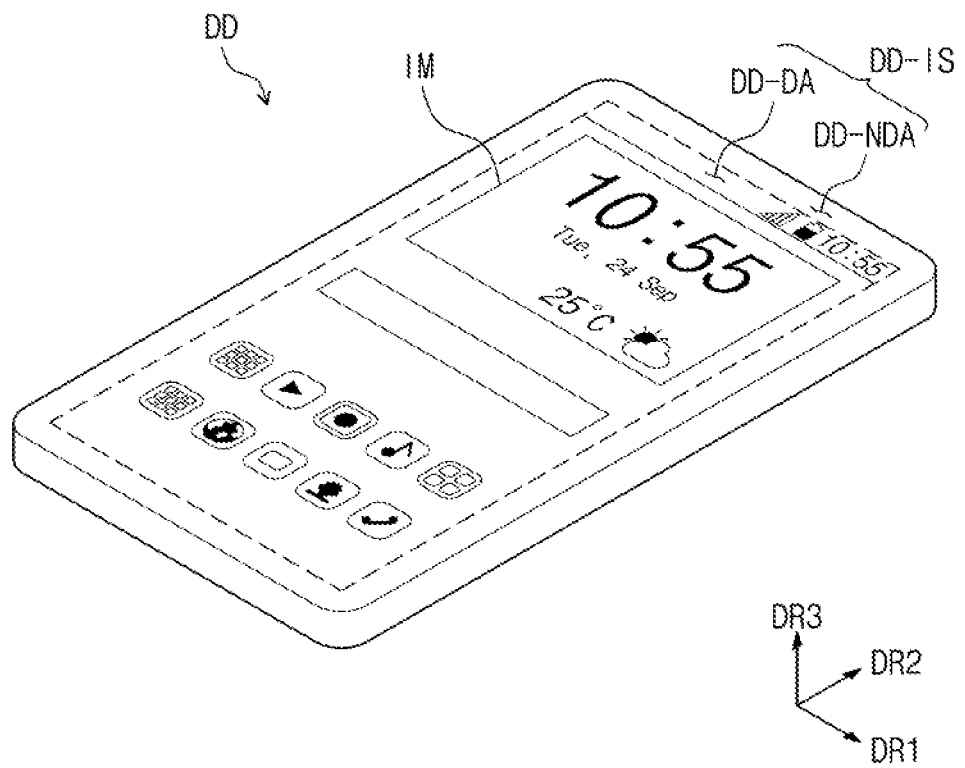
FIG. 1 is a perspective view showing a display device according to an exemplary embodiment of the present disclosure.

The present disclosure relates to a display device. More specifically, embodiments of the present disclosure relate to a display device capable of improving a sensing reliability of an electronic pen.

For example, embodiments of the present disclosure provide a display device with a display module and a sensing circuit board. The sensing circuit board includes a plurality of sensing dots disposed on the display module and generates a magnetic field. Each of the sensing dots includes continuous first and second periods. Additionally or alternatively, the sensing dots includes a transmitter, a driver, a charger, and an outputter. The transmitter transmits a reference alternating current signal. The driver is connected to the transmitter and a sensing node and outputs a node current signal. The charger is connected to the sensing node and a magnetic field may be generated. The outputter is electrically connected to an output terminal and outputs a sensing signal.

The sensing circuit board may include the sensing dots to sense position information selected by an electronic pen. Each of the sensing dots generates the magnetic field. The position information selected by the electronic pen may be sensed by comparing an intensity of the magnetic field of the sensing dot selected by the electronic pen with an intensity of the magnetic field of sensing dots that are not selected by the electronic pen.

The sensing circuit board generates the magnetic field in the sensing dots based on the reference current signal during the first period and senses the position information of the external electronic module during the second period following the first period. As a result, sensing reliability with respect to the electronic pen may be improved.

In the present disclosure, it will be understood that when an element or layer is referred to as being "on", "connected to" or "coupled to" another element or layer, it can be directly on, connected or coupled to the other element or layer or intervening elements or layers may be present. Like numerals refer to like elements throughout. In the drawings, the thickness, ratio, and dimension of components are exaggerated for an effective description of the technical content. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Therefore, a first element, component, region, layer, or section discussed below could be termed a second element, component, region, layer, or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as with a meaning consistent with the term's meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

Figure 2A:
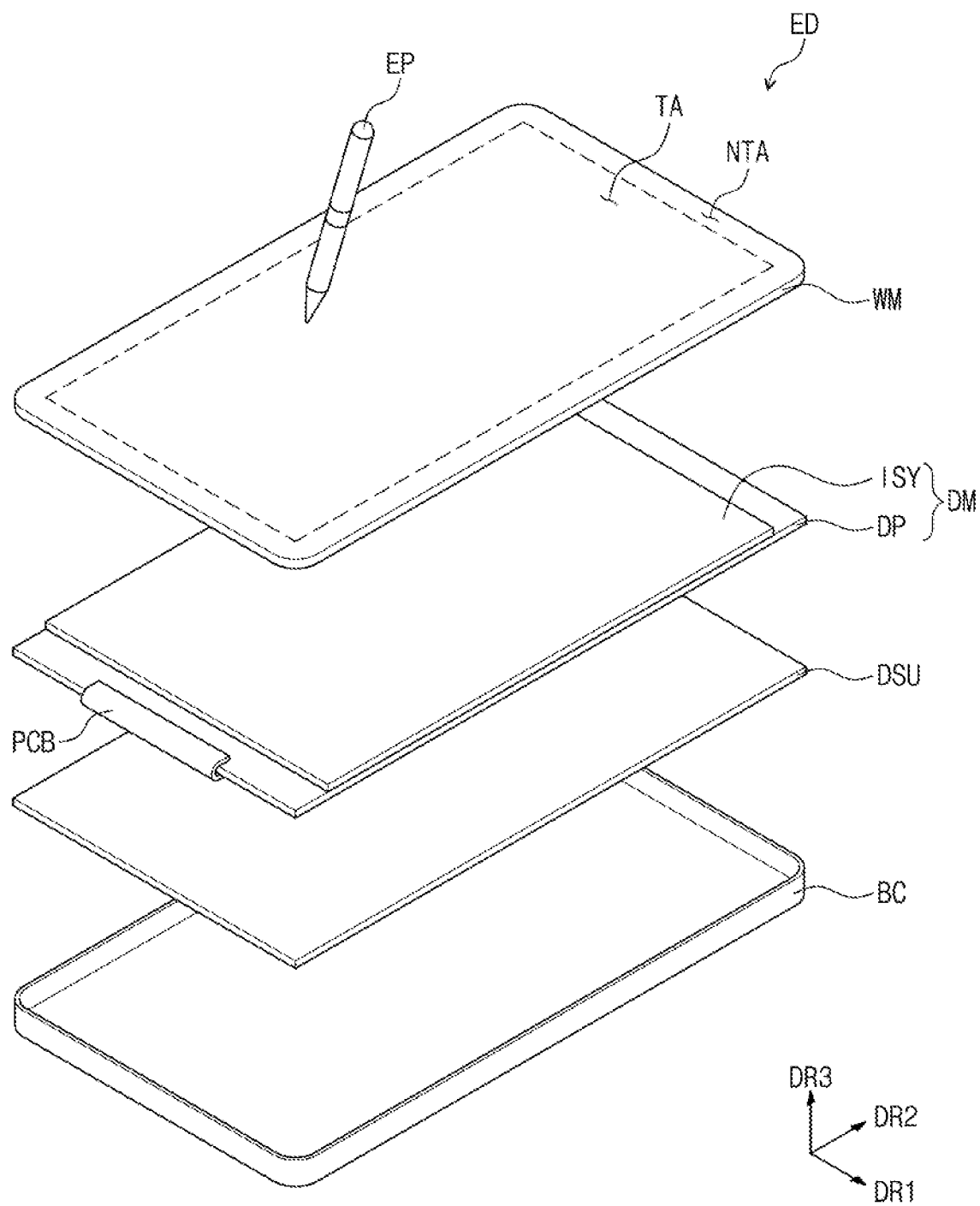
FIG. 2A is an exploded perspective view showing a portable device according to an exemplary embodiment of the present disclosure.
Figure 2B:
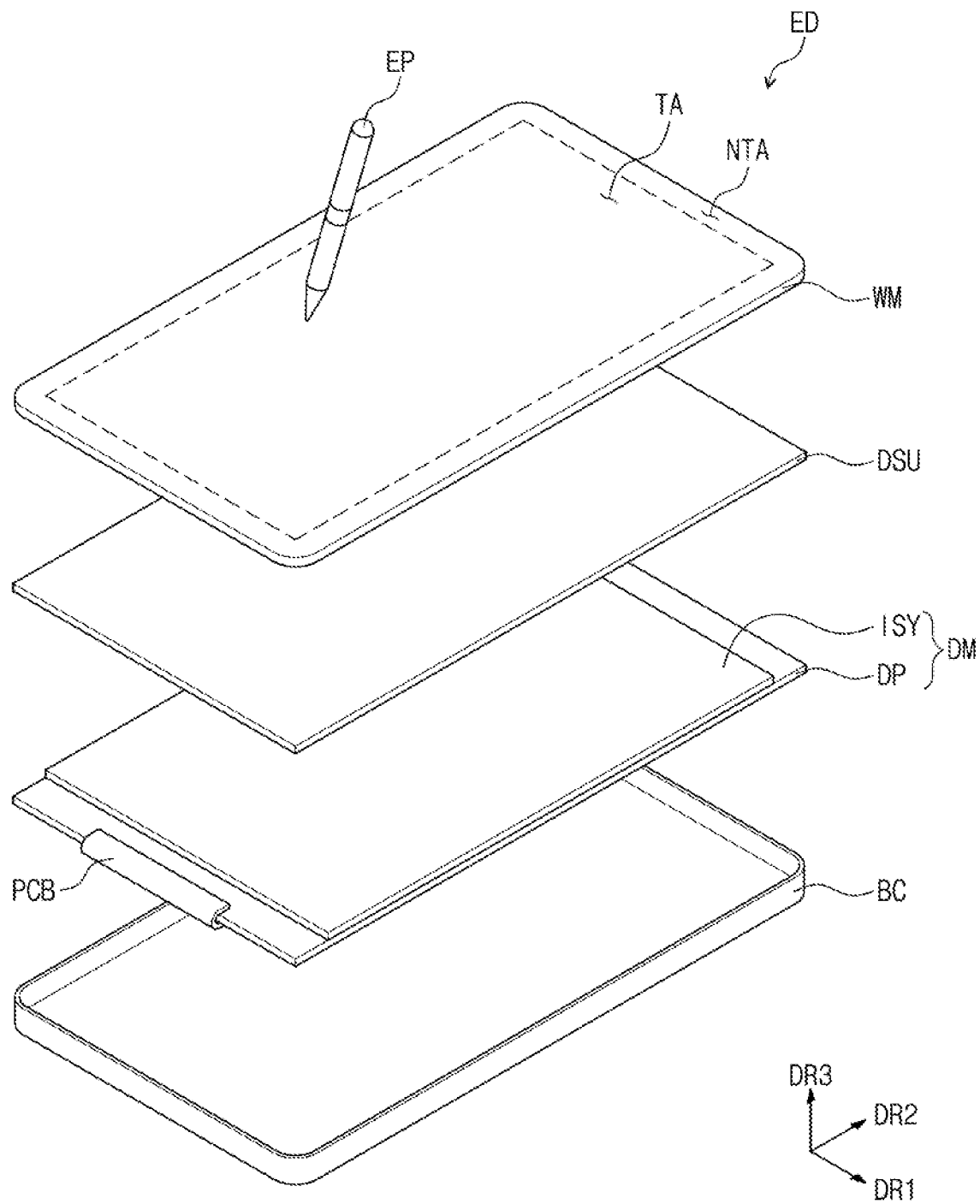
FIG. 2B is an exploded perspective view showing a portable device according to another exemplary embodiment of the present disclosure.

FIG. 1 is a perspective view showing a display device DD according to an exemplary embodiment of the present disclosure. FIG. 2A is an exploded perspective view showing a portable device ED according to an exemplary embodiment of the present disclosure. FIG. 2B is an exploded perspective view showing the portable device ED according to another exemplary embodiment of the present disclosure.

Referring to FIG. 1, the display device DD displays an image IM through a display surface DD-IS. According to the present disclosure, the display device DD includes a flat display surface DD-IS. However, the display device DD should not be limited thereto or thereby. The display device DD may include a curved display surface or a three-dimensional display surface. The three-dimensional display surface includes a plurality of display areas facing different directions, for example, a polygonal column-shaped display surface.

The display device DD may be a flexible display device or a rigid display device. Although not shown in figures, electronic modules mounted on a main board, a camera module and a power supply module may be accommodated in a bracket and a case together with the display device DD. Therefore, a mobile phone terminal may be formed. The display device DD according to the present disclosure may be applied to a large-sized electronic item, such as a television set and a monitor, and a small and medium-sized electronic item, such as a portable device, a tablet computer, a car navigation unit, a game unit, and a smartwatch.

The display surface DD-IS is substantially parallel to a plane defined by a first direction DR1 and a second direction DR2. A third direction DR3 indicates a normal line direction of the display surface DD-IS, i.e., a thickness direction of the display device DD. In the following descriptions, an expression "when viewed in a plan view" or "in a plan view" may mean a case of being viewed in the third direction DR3. Hereinafter, front (or upper) and rear (or lower) surfaces of each member or each unit of the display device DD are distinct from each other by the third direction DR3. However, the first, second, and third directions DR1, DR2, and DR3 are merely exemplary. Therefore, the directions indicated by the first, second, and third directions DR1, DR2, and DR3 may be changed to other directions, e.g., opposite directions.

As shown in FIG. 1, the display surface DD-IS includes a display area DD-DA through which the image IM is displayed and a non-display area DD-NDA defined adjacent to the display area DD-DA. The image IM is not displayed through the non-display area DD-NDA. FIG. 1 shows application icons and a clock widget as a representative example of the image IM.

Additionally or alternatively, the display area DD-DA has a quadrangular shape, and the non-display area DD-NDA surrounds the display area DD-DA. However, the display area DD-DA and the non-display area DD-NDA should not be limited thereto or thereby. The shape of the display area DD-DA and the shape of the non-display area DD-NDA may be designed relative to each other. For example, the non-display area DD-NDA may be disposed adjacent to one side of the display area DD-DA or omitted.

Referring to FIG. 2A, the portable device ED includes the display device DD and an electronic module EP. The display device DD and the electronic module EP may be operated in conjunction with each other. For example, the electronic module EP is provided in a touch pen, and information displayed through the display device DD is selected using the touch pen. The display device DD displays the information selected by the electronic module EP.

The display device DD includes a window WM, a display module DM, a sensing circuit board DSU, a driving circuit board PCB, and a bottom chassis BC.

The window WM is disposed on the display module DM and includes a transmission area TA and a non-transmission area NTA. The window WM transmits an image provided from the display module DM through the transmission area TA. The transmission area TA has a shape corresponding to the display area DD-DA. The image IM, displayed through the display area DD-DA of the display device DD, may be viewed from the outside through the transmission area TA of the window WM.

The non-transmission area NTA overlaps the non-display area DD-NDA and has a shape corresponding to the non-display area DD-NDA. The non-transmission area NTA has a relatively low light transmittance compared with the transmission area TA. However, the present disclosure should not be limited thereto or thereby, and the non-transmission area NTA may be omitted.

The window WM includes a glass, sapphire, or plastic material. The window WM is shown to have a single-layer structure. However, the window WM may include a plurality of layers. The window WM includes a base layer and at least one printed layer overlapping the non-transmission area NTA and disposed on a rear surface of the base layer. The printed layer has a predetermined color. For example, the printed layer has a black color or has other colors rather than the black color.

The electronic module EP is in direct contact with or in proximity to a surface of the window WM to select information displayed through the surface of the window WM. In the exemplary embodiment, the contact may mean that two objects directly touch each other or are in proximity to each other. For example, the electronic module EP, according to the present disclosure, is provided as the touch pen.

According to the present disclosure, the electronic module EP is operated by an electromagnetic resonance (EMR) scheme. For instance, the electronic module EP does not need a separate battery. Additionally or alternatively, the electronic module EP may be operated by a magnetic field generated by the sensing circuit board DSU.

The display module DM is disposed between the window WM and the bottom chassis BC. The display module DM includes a display panel DP and an input sensing layer ISY.

The display panel DP generates the image and provides the generated image to the window WM. According to the exemplary embodiment of the present disclosure, the display panel DP may be an organic light-emitting display panel, a liquid crystal display panel, or a quantum dot light-emitting display panel. However, the display panel DP should not be particularly limited. The organic light-emitting display panel includes organic light-emitting elements. The liquid crystal display panel includes liquid crystal molecules. The quantum dot light-emitting display panel includes a quantum dot or a quantum rod.

Hereinafter, the organic light-emitting display panel will be described as a representative example of the display panel DP. However, the present disclosure should not be limited to the organic light-emitting display panel, and various display panels may be applied to the present disclosure.

The input sensing layer ISY is disposed between the window WM and the display panel DP. The input sensing layer ISY senses an input applied thereto from the outside. The input applied from the outside is provided in a variety of ways. For example, the external input includes various forms, such as a part of a user's body, light, heat, or pressure. Also, the external inputs may include a proximity input (e.g., hovering) applied when approaching close to or adjacent to the display device DD at a predetermined distance as well as a touch input by the user's body (e.g., user's hand).

The input sensing layer ISY is disposed directly on the display panel DP. In the present exemplary embodiment, the input sensing layer ISY is formed through successive processes with the display panel DP. However, the present disclosure should not be limited thereto or thereby. The input sensing layer ISY may be coupled with the display panel DP by an adhesive layer after being provided as a separate panel.

According to the present disclosure, the input sensing layer ISY senses the external input in a capacitive method. The operation method of the input sensing layer ISY should not be particularly limited, and the input sensing layer ISY, according to the exemplary embodiment of the present disclosure, may sense the external input in an electromagnetic induction method or a pressure sensing method.

The sensing circuit board DSU is disposed under the display module DM. The sensing circuit board DSU is operated in conjunction with the electronic module EP and senses the input applied thereto through the electronic module EP. The sensing circuit board DSU receives position information of the information selected by the electronic module EP or recognizes a movement of the electronic module EP. The sensing circuit board DSU converts the information sensed by the electronic module EP to a digital signal and provides the converted digital signal to the display panel DP. For example, a digitizer may be used as the sensing circuit board DSU.

In the present exemplary embodiment, the effective distance means a minimum distance that a magnetic field is formed between the electronic module EP and the sensing circuit board DSU. According to the present disclosure, the sensing circuit board DSU generates a magnetic field based on alternating current. For example, when the electronic module EP approaches to the sensing circuit board (DSU) within an effective distance, an electromagnetic resonance (EMR) phenomenon occurs between the electronic module EP and the sensing circuit board DSU. Through this, an alternating current signal is generated by the electronic module EP, and the generated alternating current signal is provided to the sensing circuit board DSU.

The sensing circuit board DSU, according to the present disclosure, includes a plurality of sensing dots to sense the position information selected by the electronic module EP.

For example, each of the sensing dots generates the magnetic field, and the sensing dots are arranged in a matrix form. The position information selected by the electronic module EP may be sensed by comparing an intensity of the magnetic field of the sensing dots that are selected by the electronic module EP with an intensity of the magnetic field of the sensing dots that are not selected by the electronic module EP in the entire area of the sensing circuit board DSU. This will be described in detail with reference to FIG. 5.

Meanwhile, a structure that the sensing circuit board DSU is disposed between the display panel DP and the bottom chassis BC is described with reference to FIG. 2A. However, the structure of the portable device ED should not be limited thereto or thereby. As shown in FIG. 2B, the sensing circuit board DSU may be disposed between the window WM and the display module DM. In this case, the sensing circuit board DSU includes a transparent material to transmit the light exiting from the display panel DP. For instance, transistors and other components of the sensing circuit board DSU include transparent material.

The bottom chassis BC is coupled with the window WM. The bottom chassis BC provides a rear surface of the display device DD and is coupled with the window WM to define an inner space. The bottom chassis BC includes a material with a relatively high rigidity. For example, the bottom chassis BC includes a plurality of frames and/or plates formed of a glass, plastic, or metal material. The bottom chassis BC stably protects components of the display device DD, which are accommodated in the inner space, from the external impacts.

Additionally or alternatively, the bottom chassis BC is described as including the material with the relatively high rigidity. However, the bottom chassis BC should not be limited thereto or thereby. For example, the bottom chassis BC may include a flexible material. Although not shown in figures, according to the exemplary embodiment of the present disclosure, in a case where the display device DD is foldable or bendable, the components included in the display device DD may be flexible.

Figure 3:
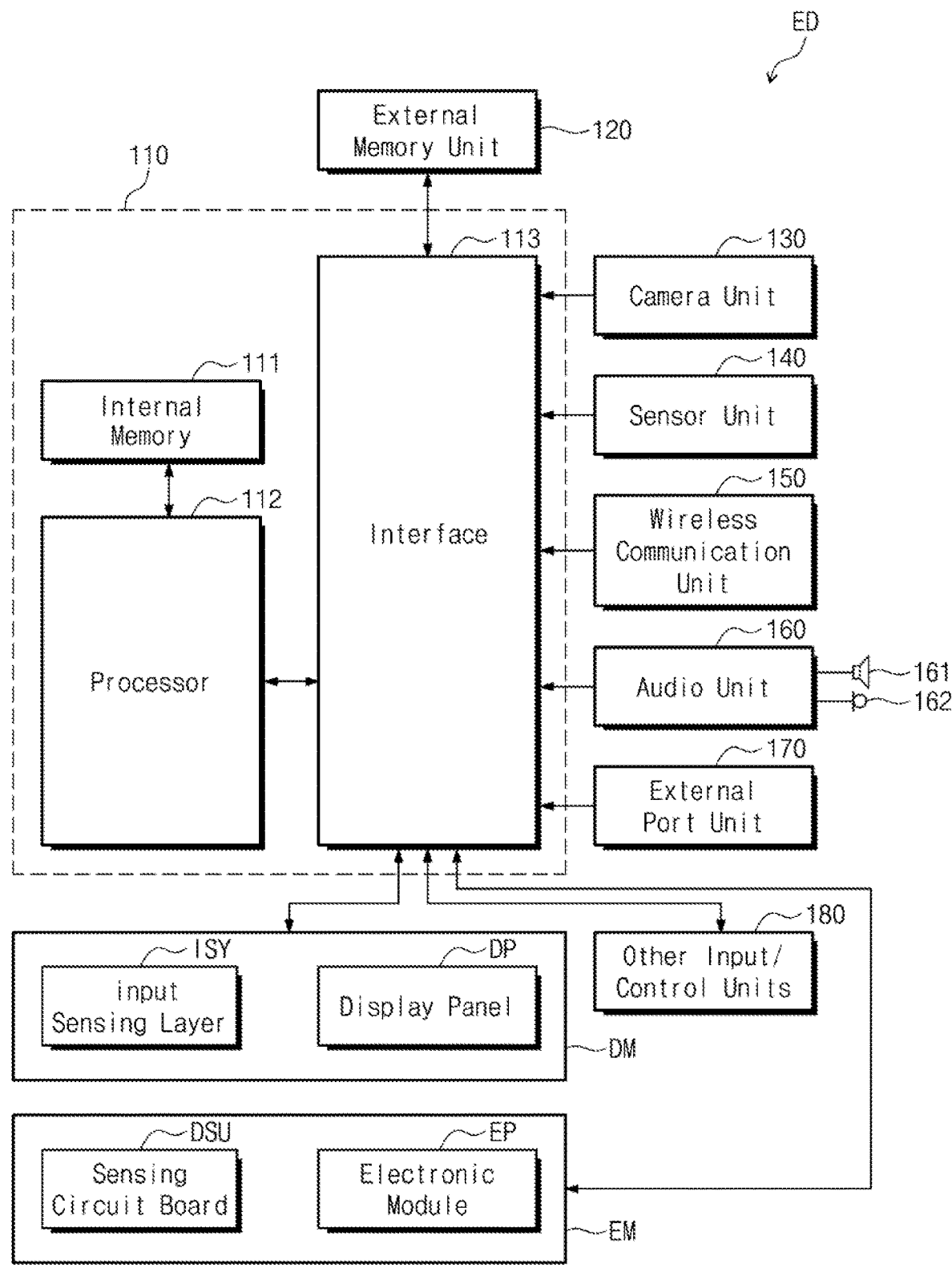
FIG. 3 is a block diagram showing a portable device according to an exemplary embodiment of the present disclosure.

FIG. 3 is a block diagram showing the portable device ED according to an exemplary embodiment of the present disclosure.

The portable device ED may be devices, such as a mobile phone, a mobile pad, a media player, a tablet computer, a handheld computer, or a personal digital assistant (PDA). Additionally or alternatively, the portable device ED may be an arbitrary electronic device including two or more functions of the devices.

The portable device ED includes a host unit 110, an external memory unit 120, a camera unit 130, a sensor unit 140, a wireless communication unit 150, an audio unit 160, an external port unit 170, the display module DM, a sensing module EM, and other input/control units 180. Each of the external memory unit 120 and the external port unit 170 may be provided in plural.

The host unit 110 includes an internal memory 111, at least one processor 112, and an interface 113. The internal memory 111, the at least one processor 112, and the interface 113 are separate components or are configured in one or more integrated circuits. The processor 112 executes software programs to perform functions for the portable device ED. Additionally or alternatively, the processor 112 performs processing and control operations for voice communication, video communication, and data communication. The processor 112 may also execute a software module (instruction set) stored in the internal memory 111 and/or the external memory unit 120 to perform various functions corresponding to the software module. Additionally or alternatively, the processor 112 executes a specific software module (instruction set) stored in the internal memory 111 and/or the external memory unit 120 to perform various specific functions corresponding to the software module. For example, the processor 112 performs a method according to an exemplary embodiment of the present disclosure in conjunction with the software modules stored in the internal memory 111 and/or the external memory unit 120. Additionally or alternatively, the processor 112 includes one or more data processors, an image processor, or a codec. Further, the portable device ED may separately configure the data processor, the image processor, or the codec. The interface 113 connects various units of the portable device ED to the host unit 110.

The external memory unit 120 includes one or more fast random access memories and/or nonvolatile memories, such as a magnetic disk storage device, or one or more optical storage devices and/or flash memories (e.g., NAND, NOR). The external memory unit 120 stores software, which includes an operating system module, a communication module, a graphics module, a user interface module, a codec module, one or more application modules, and a digitizer correction module.

The camera unit 130 performs a camera function, such as recording a picture and a video clip. The camera unit 130 includes a charge-coupled device (CCD) or a complementary metal-oxide semiconductor (CMOS). Additionally or alternatively, the camera unit 130 adjusts a hardware configuration, for example, lens shift, f-number of aperture, etc., according to a camera module executed by the processor 112.

Although not shown in figures, various components of the portable device ED are connected through one or more communication buses or one or more streamlines.

The sensor unit 140 includes a motion sensor, an optical sensor, a temperature sensor, and the like, and enables various functions. For instance, the motion sensor senses a movement of the portable device ED, and the optical sensor senses ambient light.

The wireless communication unit 150 enables wireless communication and includes a radio frequency transceiver or an optical (e.g., infrared ray) transceiver. The wireless communication device 150 is designed to operate through one of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wi-Fi (Wireless Fidelity) network, a WiMax network, and/or a Bluetooth network depending on a communication network.

The audio unit 160 is connected to a speaker 161 and a microphone 162 and performs audio input and output operations, such as voice recognition, voice replication, digital recording, and call functions. For example, the audio unit 160 communicates with the user through the speaker 161 and the microphone 162. Additionally or alternatively, the audio unit 160 receives a data signal from the host unit 110, converts the data signal to an electrical signal, and outputs the converted electrical signal through the speaker 161. The speaker 161 converts the electrical signal into an audible frequency band and outputs the converted electrical signal, and the microphone 162 converts a sound wave transmitted from a person or other sound sources into an electrical signal. Further, the audio unit 160 receives the electrical signal from the microphone 162, converts the received electrical signal to an audio data signal, and transmits the converted audio data signal to the host unit 110. The audio unit 160 may include an earphone, a headphone, or a headset attachable to and detachable from the portable device ED.

The external port unit 170 connects the portable device ED directly to another electronic device or connects the portable device ED indirectly to another electronic device through a network, e.g., an internet, an intranet, a wireless LAN, etc.

The display module DM includes the input sensing layer ISY in the capacitive method described with reference to FIG. 2A and the display panel DP. The display module DM provides input and output interfaces between the portable device ED and the user. The display module DM senses the external input using a sensing technique, transmits the external input to the host unit 110, and provides visual information, e.g., a text, a graphic, a video, etc., provided from the host unit 110 to the user.

The sensing module EM includes the sensing circuit board DSU and the electronic module EP, which are operated in conjunction with each other through the electromagnetic resonance (EMR) scheme described with reference to FIG. 2A. The sensing circuit board DSU receives the alternating current and generates the magnetic field. When the electronic module EP approaches the sensing circuit board DSU, a resonant circuit of the electronic module EP generates an alternating current signal, and the resonant circuit forms the magnetic field by the AC signal. The sensing circuit board DSU scans an intensity of the magnetic field provided from the electronic module EP over the entire area and senses the position information. The sensing circuit board DSU provides the sensed position information to the host unit 110.

The other input/control units 180 includes up/down buttons to control a volume. Besides, the other input/control units 180 includes at least one of pointer devices each to which a corresponding function is assigned, such as a push-button, a locker button, a rocker switch, a thumb-wheel, a dial, a stick, a stylus, and the like.

Figure 4:
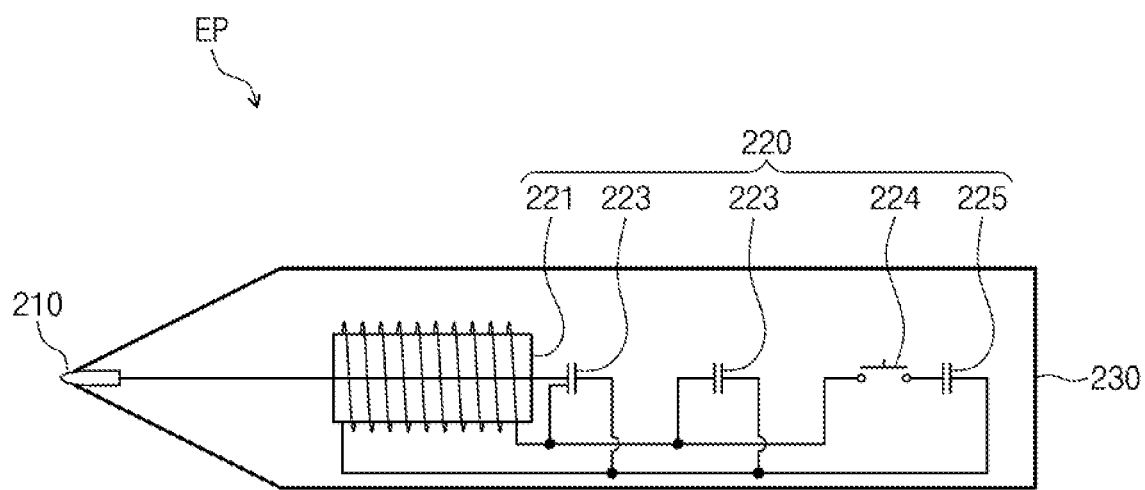
FIG. 4 is a cross-sectional view showing an electronic pen according to an exemplary embodiment of the present disclosure.

FIG. 4 is a cross-sectional view showing an electronic pen according to another exemplary embodiment of the present disclosure.

Referring to FIG. 4, the electronic module EP includes a tip 210 with a pen shape and a resonant circuit 220. Additionally or alternatively, the electronic module EP includes a housing 230 with a rod shape of which one end becomes relatively narrow and is opened and forming an accommodation space therein.

The tip 210 may protrude outward from the opened one end of the housing 230 and may move in a predetermined range in a longitudinal direction of the housing 230. The tip 210 may be self-centering, and the self-centering may mean automatically returning to the original position.

The resonant circuit 220 is disposed in the housing 230 of the electronic module EP. When the tip 210 is pressed into the housing 230 or when a button (not shown) disposed outside the housing 230 is pressed, the resonant circuit 220 changes the capacitance. The resonant circuit 220 may include an inductor 221 and a plurality of capacitors 222, 223, 224, and 225 connected in parallel. As the electronic module EP approaches the sensing circuit board DSU, the resonant circuit 220 generates the current through the electromagnetic resonance (EMR) and forms the magnetic field using the generated current. The inductor 221 forms a coil for the electromagnetic resonance (EMR).

As described above, when the tip 210 of the electronic module EP is pressed, the tip 210 moves into the housing 230 by a predetermined distance. The resonant circuit 220 includes a variable capacitor 223, the variable capacitor 223 varies the capacitance according to a degree to which the tip 210 is pressed, and the resonant circuit 220 forms a magnetic field of a variable resonant frequency corresponding to the corresponding function of the portable device ED.

Meanwhile, FIG. 4 shows the electronic module EP according to the exemplary embodiment. However, the configurations of the electronic module EP should not be limited thereto or thereby. For instance, the electronic module EP may include a battery, and the configurations of the electronic module EP may be modified in various ways.

Figure 5:
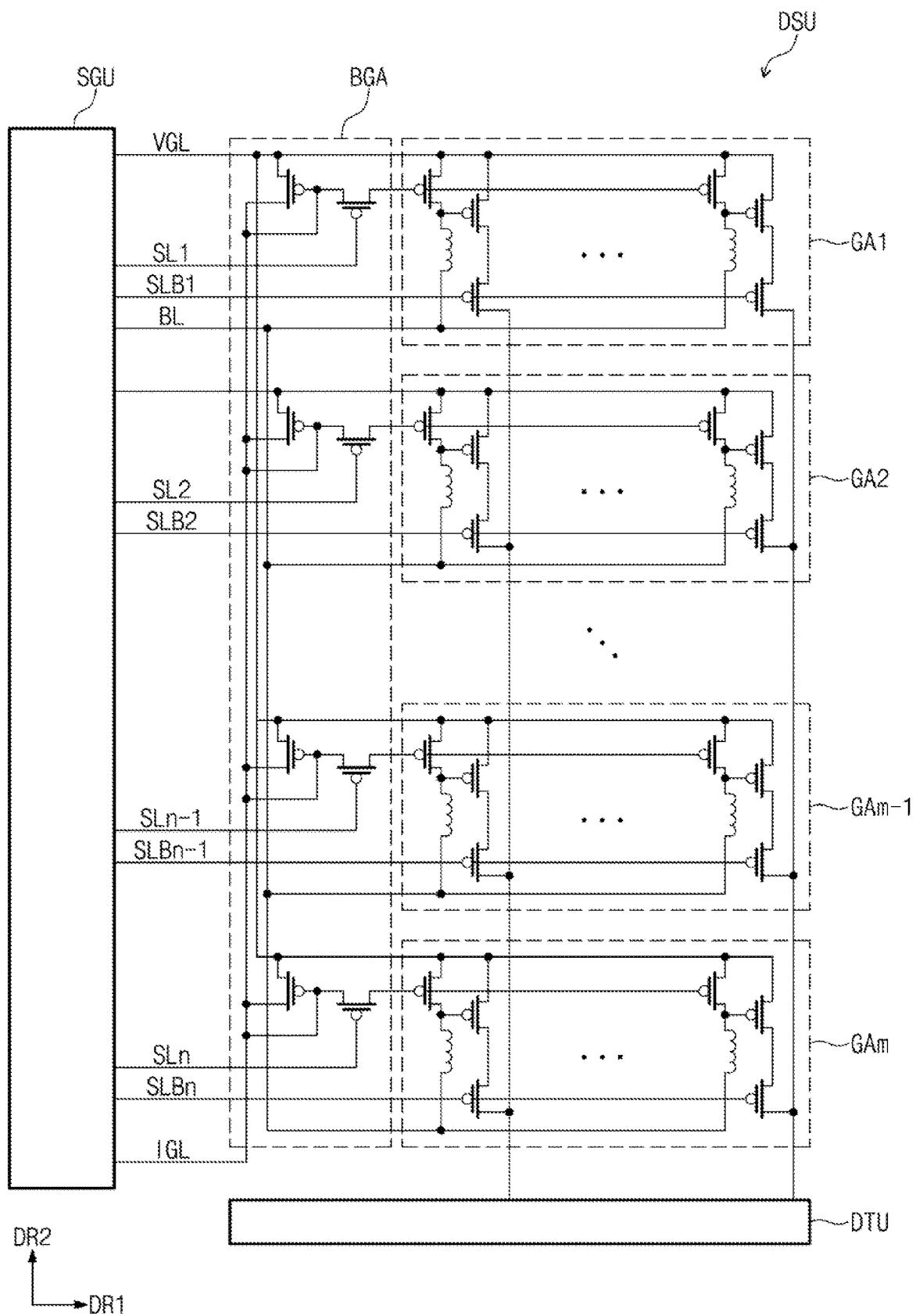
FIG. 5 is a circuit diagram showing a sensing circuit board according to an exemplary embodiment of the present disclosure.
Figure 6:
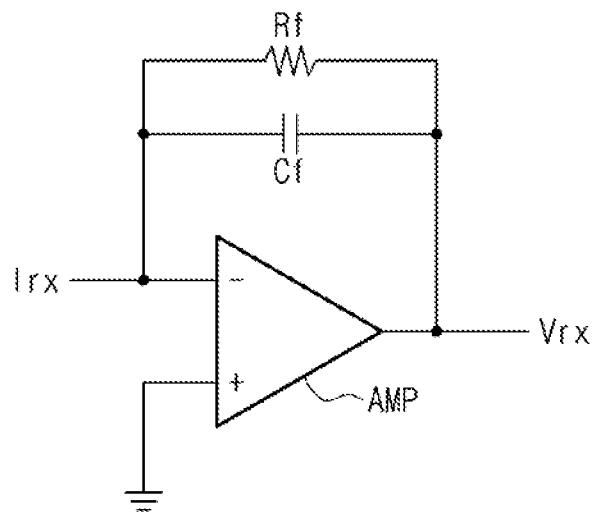
FIG. 6 is a circuit diagram showing a converting unit shown in FIG. 5 according to an exemplary embodiment of the present disclosure.

FIG. 5 is a circuit diagram showing the sensing circuit board DSU according to an exemplary embodiment of the present disclosure. FIG. 6 is a circuit diagram showing a converting unit shown in FIG. 5 according to an exemplary embodiment of the present disclosure.

Referring to FIG. 5, the sensing circuit board DSU includes a signal generator SGU, the converting unit DTU, a sensing unit, and signal lines.

The sensing unit includes a plurality of sensing areas GA1, GA2, . . . , GAm-1, and GAm divided into rows. The sensing areas GA1 to GAm extend in the first direction DR1 and are arranged in the second direction DR2. According to the present disclosure, each of the sensing areas GA1 to GAm includes a plurality of sensing dots SD, which will be described with reference to FIG. 7. Each of the sensing dots SD generates a magnetic field.

The signal generator SGU is electrically connected to the sensing areas GA1 to GAm and applies a plurality of driving signals to the sensing areas GA1 to GAm through the signal lines.

The signal lines include a power line VGL, a plurality of first selection lines SL1, SL2, . . . , SLn-1, and SLn, a plurality of second selection lines SLB1, SLB2, . . . , SLBn-1, and SLBn, a first signal line BL, a second signal line IGL, and sensing lines RL1 to RLm.

The driving signals output from the signal generator SGU may include a power signal, first selection signals, second selection signals, a bias voltage, and a reference current signal. The signal generator SGU applies the power signal to each of the sensing areas GA1 to GAm through the power line VGL. The signal generator SGU sequentially applies the first selection signals to the sensing areas GA1 to GAm through the first selection lines SL1 to SLn. Additionally or alternatively, the signal generator SGU sequentially applies the second selection signals to the sensing areas GA1 to GAm through the second selection lines SLB1 to SLBn. In this case, the first selection signals and the second selection signals have phases inverted with respect to each other.

Additionally or alternatively, the signal generator SGU applies the bias voltage to the sensing areas GA1 to GAm through the first signal line BL and applies the reference current signal to the sensing areas GA1 to GAm through the second signal line IGL.

The converting unit DTU receives sensing signals Irx through the sensing lines RL1 to RLm respectively connected to the sensing dots SD of the sensing areas GA1 to GAm. In particular, according to the present disclosure, the converting unit DTU receives the sensing signals Irx with DC or AC waveforms through the sensing lines RL1 to RLm.

Referring to FIG. 6, the converting unit DTU according to the present disclosure includes an inverting current-to-voltage converter circuit. The converting unit DTU includes an amplifier AMP that includes a first terminal (−) receiving the sensing signal Irx, wherein the sensing signal Irx is the alternating current signal, and a second terminal (+) receiving a ground voltage, a capacitor Cf, and a resistor Rf connected to the capacitor Cf in parallel. The converting unit DTU receives the sensing signal Irx corresponding to a current signal and converts the sensing signal Irx to a sensing signal Vrx corresponding to a voltage signal. Meanwhile, the converting unit DTU shown in FIG. 6 is merely exemplary, and the configurations of the converting unit DTU may be changed in various ways.

Although not shown in figures, the sensing circuit board DSU may further include a controller that receives the sensing signal Vrx corresponding to the voltage signal and senses the position information. The controller transmits the position information to the host unit 110 shown in FIG. 2A.

As described above, the sensing dots SD of each of the sensing areas GA1 to GAm generate the magnetic field in response to the driving signals output from the signal generator SGU. In this case, when the electronic module EP (refer to FIG. 2A) approaches the sensing circuit board DSU within an effective distance, the electromagnetic resonance (EMR) phenomenon occurs between the electronic module EP and the sensing areas GA1 to GAm. The controller included in the sensing circuit board DSU figures out the position information selected by the electronic module EP in response to the sensing signal Vrx provided through the converting unit DTU.

Figure 7:
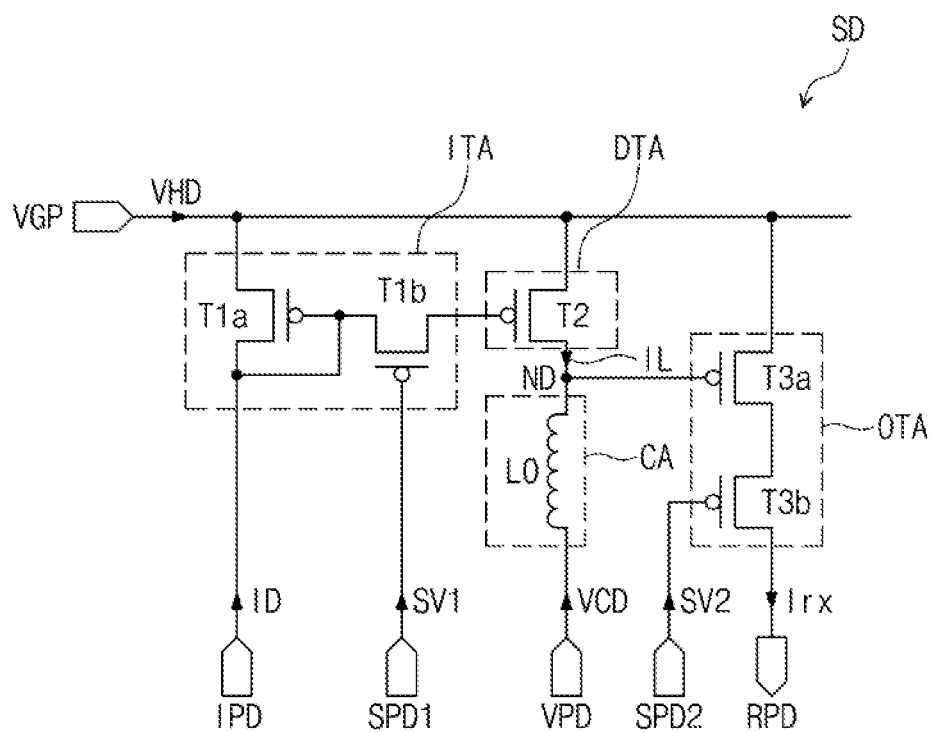
FIG. 7 is a circuit diagram showing a sensing unit according to an exemplary embodiment of the present disclosure.
Figure 8:
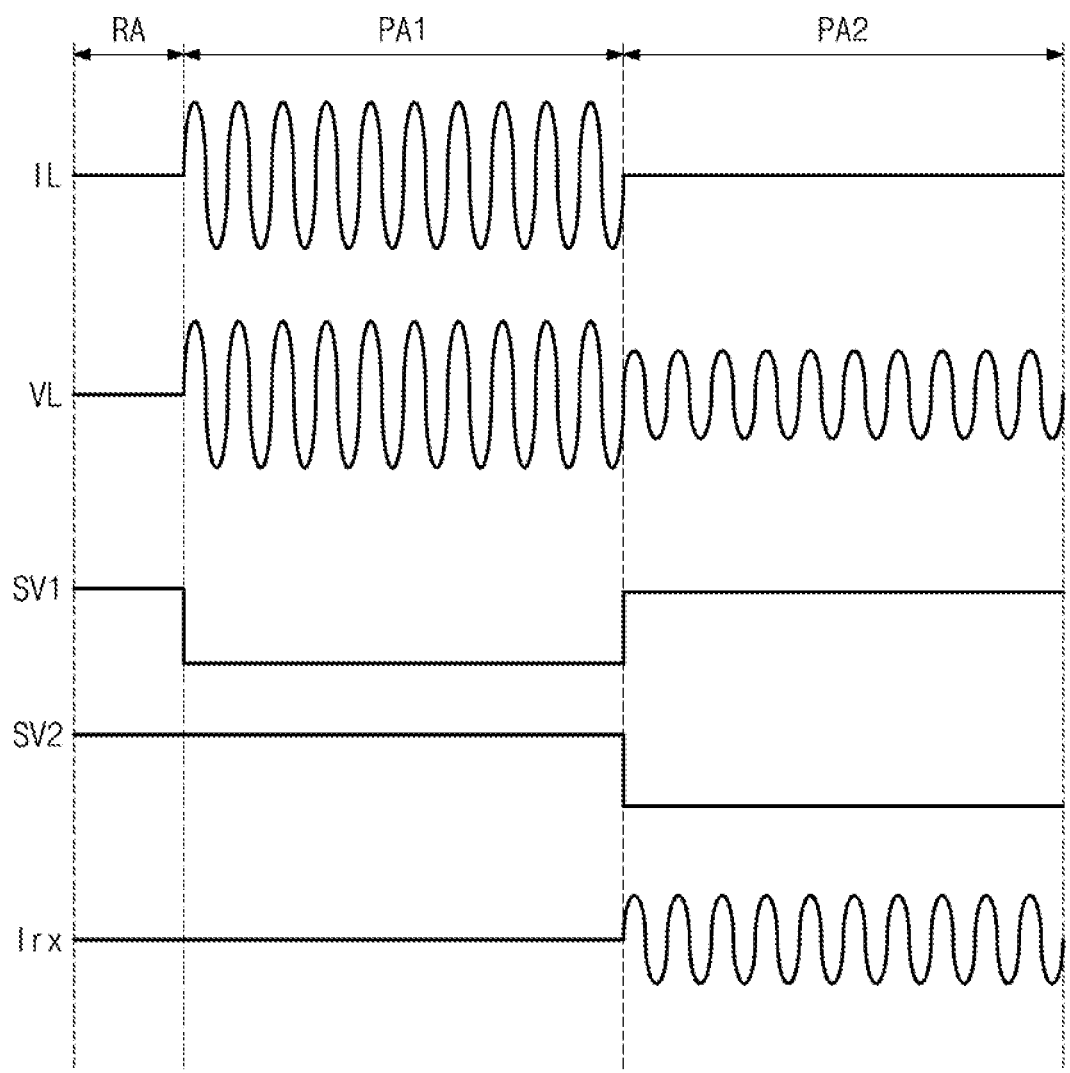
FIG. 8 is a timing diagram showing an operation of a sensing circuit board according to an exemplary embodiment of the present disclosure.
Figure 9:
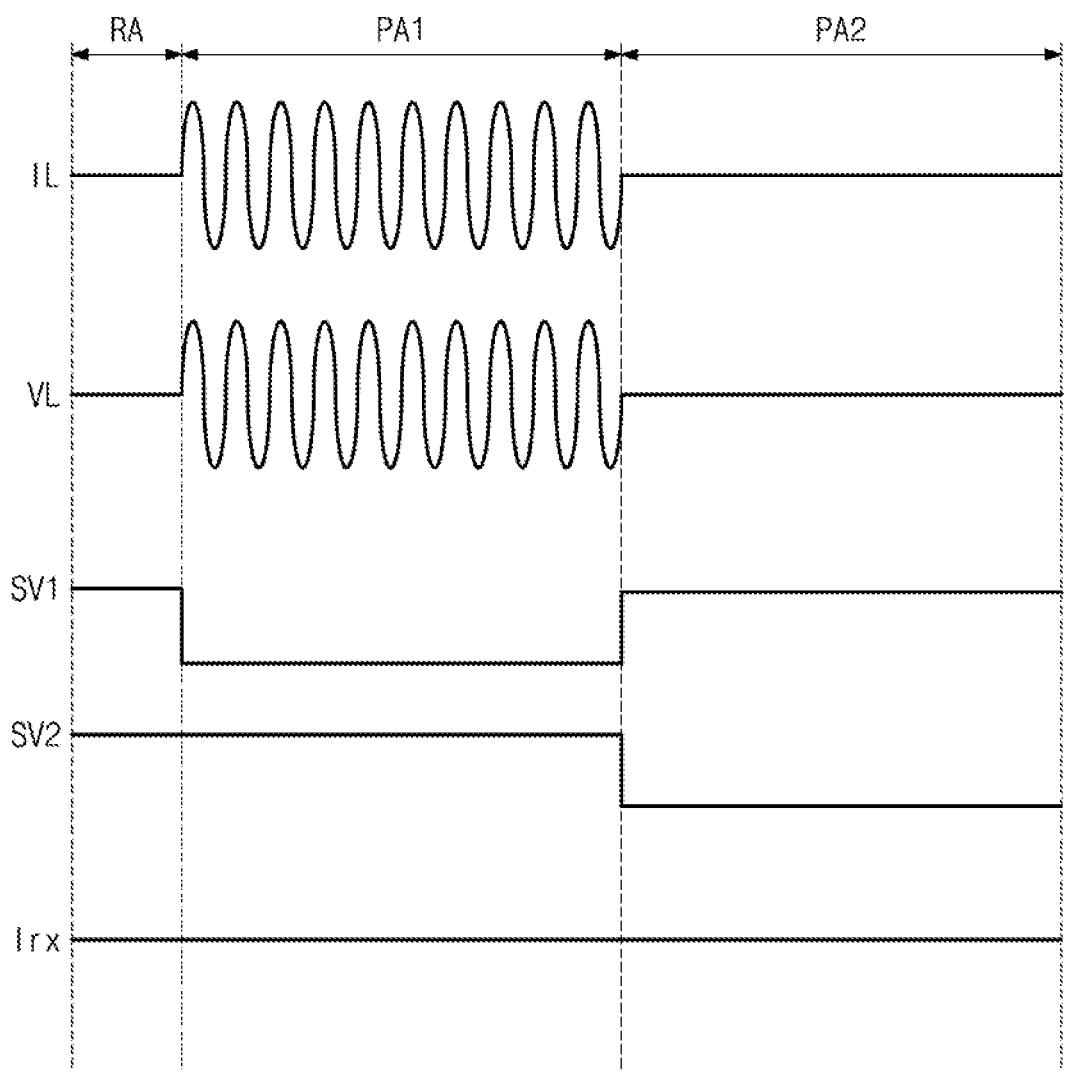
FIG. 9 is a timing diagram showing an operation of a sensing circuit board according to an exemplary embodiment of the present disclosure.

FIG. 7 is a circuit diagram showing the sensing unit according to an exemplary embodiment of the present disclosure. FIG. 8 is a timing diagram showing an operation of the sensing circuit board DSU according to an exemplary embodiment of the present disclosure. FIG. 9 is a timing diagram showing an operation of the sensing circuit board DSU according to an exemplary embodiment of the present disclosure.

FIG. 7 shows one sensing dot among the sensing dots SD included in each of the sensing areas GA1 to GAm shown in FIG. 6. Hereinafter, the sensing dots included in the sensing areas GA1 to GAm may have a configuration corresponding to the circuit configuration shown in FIG. 7.

Referring to FIGS. 5 and 7, the sensing dot SD includes a transmitter ITA, a driver DTA, a charger CA, and an outputter OTA.

The transmitter ITA includes a first control transistor T1a and a second control transistor T1b. The first control transistor T1a includes a first control electrode, a first electrode, and a second electrode. Each of the first control electrode and the first electrode of the first control transistor T1a receives a reference current signal ID output from a reference terminal IPD of the signal generator SGU through the second signal line IGL.

The reference current signal ID, according to the present disclosure, may be the alternating current signal. The second electrode of the first control transistor T1a is connected to the power line VGL that transmits a power signal VHD output from a power terminal VGP of the signal generator SGU.

According to the present disclosure, the first control transistor T1a has a current mirror structure. Therefore, the reference current signal ID output from the reference terminal IPD is transmitted to the second control transistor T1b.

The second control transistor T1b includes a second control electrode, a third electrode, and a fourth electrode. The second control electrode of the second control transistor T1b receives a first selection signal SV1 output from a first selection terminal SPD1 of the signal generator SGU through a corresponding first selection line among the first selection lines SL1 to SLn. The third electrode of the second control transistor T1b is connected to the first control electrode of the first control transistor T1a. The fourth electrode of the second control transistor T1b is connected to the driver DTA. The second control transistor T1b transmits the reference current signal ID applied thereto through the first control transistor T1a to the driver DTA in response to an active level of the first selection signal SV1.

The driver DTA includes a driving transistor T2 with a driving control electrode, a first driving electrode, and a second driving electrode. The driving control electrode of the driving transistor T2 is connected to the fourth electrode of the second control transistor T1b and receives the reference current signal ID. The first driving electrode of the driving transistor T2 is connected to the power line VGL that transmits the power signal VHD. The second driving electrode of the driving transistor T2 is connected to a sensing node ND.

According to the present disclosure, the driving transistor T2 transmits a node current signal IL to the sensing node ND in response to the reference current signal ID. The node current signal IL is a signal based on the reference current signal ID and the power signal VHD output from the power terminal VGP.

Particularly, when the first selection signal SV1 output from the first selection terminal SPD1 is at an active level, the second control transistor T1b maintains a turned-on state in which the third electrode and the fourth electrode are electrically connected. As a result, the driving transistor T2 transmits the node current signal IL to the sensing node ND in response to the reference current signal ID.

On the contrary, when the first selection signal SV1 output from the first selection terminal SPD1 is at an inactive level, the second control transistor T1b maintains a turned-off state in which the third electrode and the fourth electrode are not electrically connected. As a result, the reference current signal ID is not transmitted to the driving control electrode of the driving transistor T2.

The charger CA includes an inductor LO. One end of the inductor LO is connected to the sensing node ND, and the other end of the inductor LO is connected to the first signal line BL. The inductor LO receives a bias voltage VCD output from a bias terminal VPD of the signal generator SGU through the first signal line BL.

According to the present disclosure, the inductor LO generates the magnetic field in response to the node current signal IL provided from the sensing node ND. When the node current signal IL is not transmitted to the sensing node ND, a level of the sensing node ND corresponds to the bias voltage VCD.

The outputter OTA includes a first output transistor T3a and a second output transistor T3b. The first output transistor T3a includes a first output control electrode, a first output electrode, and a second output electrode. The first output control electrode of the first output transistor T3a is connected to the sensing node ND. The first output electrode of the first output transistor T3a is connected to the power terminal VGP. The second output electrode of the first output transistor T3a is connected to the second output transistor T3b. The first output transistor T3a transmits the sensing signal Irx to the second output transistor T3b in response to the level of the sensing node ND. The sensing signal Irx is a signal based on the level of the sensing node ND and the power signal VHD output from the power terminal VGP.

The second output transistor T3b includes a second output control electrode, a third output electrode, and a fourth output electrode. The second output control electrode of the second output transistor T3b receives a second selection signal SV2 output from a second selection terminal SPD2 of the signal generator SGU through a corresponding second selection line of the second selection lines SLB1 to SLBn. The third output electrode of the second output transistor T3b is connected to the second output electrode of the first output transistor T3a, and the fourth output electrode of the second output transistor T3b is connected to an output terminal RPD of the converting unit DTU.

The outputter OTA outputs the sensing signal Irx applied thereto from the first output transistor T3a to the output terminal RPD in response to the level of the sensing node ND.

According to embodiments of the present disclosure, when the second selection signal SV2 output from the second selection terminal SPD2 is at an active level, the second output transistor T3b maintains a turned-on state in which the third output electrode and the fourth output electrode are electrically connected. As a result, the second output transistor T3b transmits the sensing signal Irx to the output terminal RPD. Meanwhile, when the second selection signal SV2 output from the second selection terminal SPD2 is at the active level, the first selection signal SV1 output from the first selection terminal SPD1 is at the inactive level.

On the contrary, when the second selection signal SV2 output from the second selection terminal SPD2 is at an inactive level, the second output transistor T3b maintains a turned-off state in which the third output electrode and the fourth output electrode are not electrically connected. As a result, the second output transistor T3b does not transmit the sensing signal Irx to the output terminal RPD. Meanwhile, when the second selection signal SV2 output from the second selection terminal SPD2 is at the inactive level, the first selection signal SV1 output from the first selection terminal SPD1 is at the active level.

As shown in FIG. 7, the transistors included in the sensing dot SD, according to the present disclosure, are PMOS transistors.

Hereinafter, the operation characteristics of the sensing dot SD of the present disclosure will be described in more detail with reference to FIGS. 8 and 9. FIG. 8 shows the timing diagram when the electronic module EP approaches the sensing dot SD, and FIG. 9 shows the timing diagram when the electronic module EP does not approach the sensing dot SD.

According to the exemplary embodiment of the present disclosure, the sensing dot SD has a reset period RA, a first period PA1, and a second period PA2. The reset period RA, the first period PA1, and the second period PA2 may be continuous in time (e.g., they may be adjacent time periods).

Referring to FIG. 8, the reset period RA is a period in which each of the first selection signal SV1 and the second selection signal SV2 has the inactive level. Since the transistors included in the sensing dot SD are the PMOS transistor, the inactive level of the first selection signal SV1 and the second selection signal SV2 in the reset period RA corresponds to a high level.

Accordingly, during the reset period RA, the bias voltage VCD output from the bias terminal VPD is provided to the inductor LO, and the level of the sensing node ND corresponds to the bias voltage VCD.

Then, during the first period PA1, the first selection signal SV1 is transited to the active level, and the second selection signal SV2 maintains the inactive level. The active level of the first selection signal SV1 corresponds to a low level. As the first selection signal SV1 has the active level during the first period PA1, the driver DTA outputs the node current signal IL to the sensing node ND in response to the reference current signal ID output from the reference terminal IPD. For example, the sensing node ND is electrically connected to the transmitter ITA during the first period PA1 in response to the active level of the first selection signal SV1.

In particular, the node current signal IL may have an AC waveform in response to the reference current signal ID, wherein the reference current signal ID is an alternating current signal. Additionally or alternatively, the level VL of the sensing node ND has an AC waveform according to the node current signal IL. The node current signal IL transmitted to the sensing node ND is charged in the inductor LO of the charger CA, and the inductor LO generates the magnetic field.

Meanwhile, as the second selection signal SV2 maintains the inactive level, the outputter OTA does not transmit the sensing signal Irx to the output terminal RPD.

Then, during the second period PA2, the first selection signal SV1 is transited to the inactive level, and the second selection signal SV2 is transited to the active level. The active level of the second selection signal SV2 corresponds to the low level.

According to the present disclosure, when the electronic module EP approaches the sensing circuit board DSU within the effective distance, the electromagnetic resonance (EMR) phenomenon occurs between the inductor 221 included in the resonant circuit 220 of the electronic module EP and the inductor LO of the sensing dot SD. As a result, the level VL of the sensing node ND has the voltage level of the AC waveform during the second period PA2 due to the external alternating current signal output from the inductor 221 of the electronic module EP.

The first output transistor T3a of the outputter OTA transmits the sensing signal Irx with the AC waveform to the second output transistor T3b during the second period PA2 in response to the level VL of the sensing node ND. As the second output transistor T3b maintains the turned-on state by the second selection signal SV2 with the active level during the second period PA2, the sensing signal Irx with the AC waveform is transmitted to the output terminal RPD through the second output transistor T3b. In this case, the sensing node ND may not be electrically connected to the transmitter ITA during the second period PA2 in response to the inactive level of the first selection signal SV1.

As shown in FIG. 8, when the inductor 221 of the electronic module EP and the inductor LO of the sensing dot SD generates the electromagnetic resonance (EMR) phenomenon, the sensing signal Irx with the AC waveform is generated during the second period PA2.

According to the above, a sensing dot to which the electronic module EP approaches among the sensing dots included in the sensing areas GA1 to GAm shown in FIG. 5 outputs the sensing signal Irx with the AC waveform in the second period PA2.

The controller (not shown) of the sensing circuit board DSU, according to the present disclosure, analyzes the sensing signal Irx output from each of the sensing dots. Therefore, the controller figures out the position information of the point at which the electronic module EP touches. For instance, the controller of the sensing circuit board DSU receives the sensing signal Vrx which is current-voltage converted by the converting unit DTU shown in FIG. 6. The controller determines that the electronic module EP approaches the corresponding sensing dot as the sensing signal Vrx has a signal intensity of the AC waveform.

Referring to FIG. 9, when the electronic module EP is spaced more than the effective distance from the sensing circuit board DSU, the electromagnetic resonance (EMR) phenomenon does not occur between the inductor 221 included in the resonant circuit 220 of the electronic module EP and the inductor LO of the sensing dot SD. As a result, the level VL of the sensing node ND has the voltage level of the DC waveform during the second period PA2 in response to the bias voltage VCD output from the bias terminal VPD.

The first output transistor T3a of the outputter OTA transmits the sensing signal Irx with the DC waveform to the second output transistor T3b during the second period PA2 in response to the level VL of the sensing node ND. As the second output transistor T3b maintains the turned-on state by the second selection signal SV2 with the active level during the second period PA2, the sensing signal Irx with the DC waveform is transmitted to the output terminal RPD through the second output transistor T3b.

The controller of the sensing circuit board DSU receives the sensing signal Vrx which is current-voltage converted by the converting unit DTU. The controller determines that the corresponding sensing dot does not correspond to the position information as the sensing signal Vrx has a signal intensity of the DC waveform.

Accordingly, embodiments of the present disclosure may include a method of detecting input to an electronic device, the method comprising: generating a first magnetic field at a sensor (e.g., a sensing dot SD) during a first period, such that the magnetic field causes an EMR phenomenon in an external electronic device (e.g., the electronic module EP); detecting a second magnetic field during a second period following the first period, wherein the second magnetic field is based at least in part on the EMR in the external electronic device; and determining a position of the external electronic device based on detecting the second magnetic field. For example, the position of the external electronic device may be determined by comparing the intensity of the second magnetic field to the intensity of the magnetic field of other sensing locations during the second period.

In some examples, the first magnetic field is based on a first selection signal (e.g., first selection signal SV1) that has a first active level during the first period and a first inactive level during the second period; and the second magnetic field is detected based on a second selection signal (e.g., second selection signal SV2) that has a second inactive level during the first period and a second active level during the second period. In some cases, a phase of the second selection signal SV2 is inverted with respect to the first selection signal SV1.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. A display device comprising:
   a display module; and
   a sensing circuit board comprising a plurality of sensing dots disposed on the display module and configured to generate a magnetic field, wherein the sensing circuit board is configured to operate each of the sensing dots according to a first period and a second period, and wherein the sensing circuit board further comprises:
   a transmitter configured to transmit a reference alternating current signal during the first period in response to an active level of a first selection signal;
   a driver connected to the transmitter and a sensing node and configured to output a node current signal to the sensing node in response to the reference alternating current signal transmitted through the transmitter during the first period;
   a charger connected to the sensing node and configured to generate the magnetic field in response to the node current signal; and
   an outputter configured to be electrically connected to an output terminal in response to an active level of a second selection signal having a phase inverted with respect to the first selection signal during the second period, wherein the outputter is further configured to output a sensing signal to the output terminal in response to a level of the sensing node.

2. The display device of claim 1, wherein the level of the sensing node is controlled by an intensity of the magnetic field between the charger and an external electronic module during the second period.

3. The display device of claim 2, wherein, when a distance between the sensing circuit board and the external electronic module is within an effective distance, the level of the sensing node has a voltage level of an alternating current waveform during the second period by an external alternating current signal provided from the external electronic module.

4. The display device of claim 3, wherein the outputter is connected to the sensing node and a power terminal, wherein the outputter outputs a power signal output from the power terminal to the output terminal in response to the voltage level of the alternating current waveform during the second period, and the sensing signal corresponds to the alternating current waveform of the power signal transmitted to the output terminal from the power terminal in response to the voltage level of the alternating current waveform.

5. The display device of claim 2, wherein, when a distance between the sensing circuit board and the external electronic module is greater than an effective distance, the level of the sensing node has a voltage level of a direct current waveform during the second period.

6. The display device of claim 5, wherein the charger is disposed between a bias terminal and the sensing node, and the level of the sensing node corresponds to a bias voltage output from the bias terminal.

7. The display device of claim 1, wherein the output terminal is not electrically connected to the sensing node during the first period in response to an inactive level of the second selection signal, and the output terminal is electrically connected to the sensing node during the second period in response to the active level of the second selection signal.

8. The display device of claim 7, wherein the sensing node is electrically connected to the transmitter during the first period in response to the active level of the first selection signal, and the sensing node is not electrically connected to the transmitter during the second period in response to an inactive level of the first selection signal.

9. The display device of claim 1, wherein the transmitter comprises:
   a first control transistor comprising a first control electrode and a first electrode, which are connected to a reference terminal outputting the reference alternating current signal, and a second electrode connected to a power terminal; and a second control transistor comprising a second control electrode receiving the first selection signal, a third electrode connected to the first control electrode, and a fourth electrode connected to the driver.

10. The display device of claim 9, wherein the driver comprises a driving transistor comprising a driving control electrode connected to the fourth electrode, a first driving electrode connected to the power terminal, and a second driving electrode connected to the sensing node, and the charger comprises an one end connected to the sensing node and another end connected to a bias terminal outputting a bias voltage.

11. The display device of claim 10, wherein the charger comprises:

a first output transistor comprising a first output control electrode connected to the sensing node, a first output electrode connected to the power terminal, and a second output electrode; and a second output transistor comprising a second output control electrode receiving the second selection signal, a third output electrode connected to the second output electrode, and a fourth output electrode connected to the output terminal.

12. The display device of claim 1, wherein the sensing circuit board further comprises:

a signal generator configured to output the reference alternating current signal, the first selection signal, and the second selection signal to the sensing dots; and a converting unit connected to the output terminal to receive the sensing signal and configured to convert the sensing signal to a voltage.

13. The display device of claim 1, wherein the display module comprises:

a display panel; and an input sensing layer disposed on the display panel and configured to sense an external input.

14. The display device of claim 13, wherein the sensing circuit board is disposed under the display panel.

15. The display device of claim 13, wherein the sensing circuit board is disposed on the input sensing layer, and the sensing dots comprise a transparent electrode.

16. A display device comprising:

a display module; and a sensing circuit board comprising a plurality of sensing dots disposed on the display module and configured to generating a magnetic field, each of the sensing dots comprising:

a first control transistor comprising a first control electrode and a first electrode, which are connected to a reference terminal configured to output a reference alternating current signal, and a second electrode connected to a power terminal;

a second control transistor comprising a second control electrode configured to receive a first selection signal, a third electrode connected to the first control electrode, and a fourth electrode;

a driving transistor comprising a driving control electrode connected to the fourth electrode, a first driving electrode connected to the power terminal, and a second driving electrode connected to a sensing node;

an inductor comprising an one end connected to the sensing node and another end connected to a bias terminal and configured to output a bias voltage;

a first output transistor comprising a first output control electrode connected to the sensing node, a first output electrode connected to the power terminal, and a second output electrode; and a second output transistor comprising a second output control electrode configured to receive a second selection signal having a phase inverted with respect to the first selection signal, a third output electrode connected to the second output electrode, and a fourth output electrode connected to an output terminal.

17. The display device of claim 16, wherein each of the sensing dots comprises continuous first and second periods, the second control transistor is turned on in response to the first selection signal having an active level during the first period, and the second output transistor is turned on in response to the second selection signal having an active level during the second period.

18. The display device of claim 17, wherein a sensing signal having an alternating current waveform or a direct current waveform is output to the output terminal during the second period based on a distance between the sensing circuit board and an external electronic module.

19. The display device of claim 17, wherein the inductor generates a magnetic field based on the reference alternating current signal during the first period.

20. A portable device comprising:

a display device; and an electronic module selecting information displayed through the display device, the display device comprising:

a display module; and a sensing circuit board comprising a plurality of sensing dots configured to generate a magnetic field with the electronic module, wherein each of the sensing dots is configured to operate according to continuous first and second periods, the sensing circuit board further comprising:

a transmitter configured to transmit a reference alternating current signal during the first period in response to an active level of a first selection signal;

a driver connected to the transmitter and a sensing node and configured to output a node current signal to the sensing node in response to the reference alternating current signal transmitted through the transmitter during the first period;

a charger connected to the sensing node and configured to generate the magnetic field in response to the node current signal; and an outputter configured to be electrically connected to an output terminal in response to an active level of a second selection signal having a phase inverted with respect to the first selection signal during the second period and configured to output a sensing signal to the output terminal in response to a level of the sensing node.

* * * * *